(12) United States Patent
Henschel

(10) Patent No.: US 7,631,436 B2
(45) Date of Patent: Dec. 15, 2009

(54) SPIRIT LEVEL

(75) Inventor: Jürgen Henschel, Annweiler (DE)

(73) Assignee: Stabila Messgerate Gustav Ullrich GmbH, Annweiler (DE)

( * ) Notice: Subject to any disclaimer, the term of this patent is extended or adjusted under 35 U.S.C. 154(b) by 20 days.

(21) Appl. No.: 12/046,655

(22) Filed: Mar. 12, 2008

(65) Prior Publication Data

US 2008/0229595 A1 Sep. 25, 2008

(30) Foreign Application Priority Data

Mar. 22, 2007 (DE) .................. 20 2007 004 412 U

(51) Int. Cl.
*G01C 9/18* (2006.01)
(52) U.S. Cl. ............... 33/451; 33/404; 33/379
(58) Field of Classification Search ........... 33/354, 33/379–390, 451, 492, 404, 407, 408
See application file for complete search history.

(56) References Cited

U.S. PATENT DOCUMENTS

| 205,795 | A | * | 7/1878 | Green | 33/492 |
| 420,880 | A | * | 2/1890 | Lambdin | 33/404 |
| 1,855,394 | A | * | 4/1932 | Hill | 33/374 |
| 4,503,624 | A | * | 3/1985 | Whiteford | 33/451 |
| 5,353,509 | A | * | 10/1994 | Black | 33/451 |
| 5,933,974 | A | * | 8/1999 | Walters et al. | 33/404 |
| 6,305,093 | B1 | * | 10/2001 | Venola | 33/451 |
| 6,675,490 | B1 | * | 1/2004 | Krehel et al. | 33/382 |
| 6,807,743 | B2 | * | 10/2004 | Odachowski | 33/374 |
| 6,851,201 | B1 | * | 2/2005 | Gioia et al. | 33/492 |
| 6,915,586 | B2 | * | 7/2005 | Hickey | 33/379 |
| 2003/0070310 | A1 | * | 4/2003 | Werner et al. | 33/474 |

FOREIGN PATENT DOCUMENTS

| DE | 8303339 | 7/1983 |
| DE | 3414216 | 10/1985 |
| DE | 9317625 | 7/1994 |
| DE | 19503408 | 9/1996 |
| DE | 20202126 | 5/2002 |

* cited by examiner

*Primary Examiner*—G. Bradley Bennett
(74) *Attorney, Agent, or Firm*—Dennison, Schultz & MacDonald

(57) ABSTRACT

A spirit level (10) includes a profiled body with lateral surfaces (20, 22), end faces or areas (24, 26), and longitudinal surfaces (28, 30) that form measuring surfaces running between the lateral surfaces, which project laterally over the lateral surfaces with their longitudinal edges (32, 34, 36, 38), as well as at least one position sensor, such as a vial (14, 16, 18). In order to carry out a verification of horizontality or verticality not only in the conventional way, but especially also to assist in maintaining intervals in assembled brickwork, it is proposed to provide a uniform series of indentations (46, 48, 50, 52, 54, 56, 58) within at least one longitudinal edge.

15 Claims, 2 Drawing Sheets

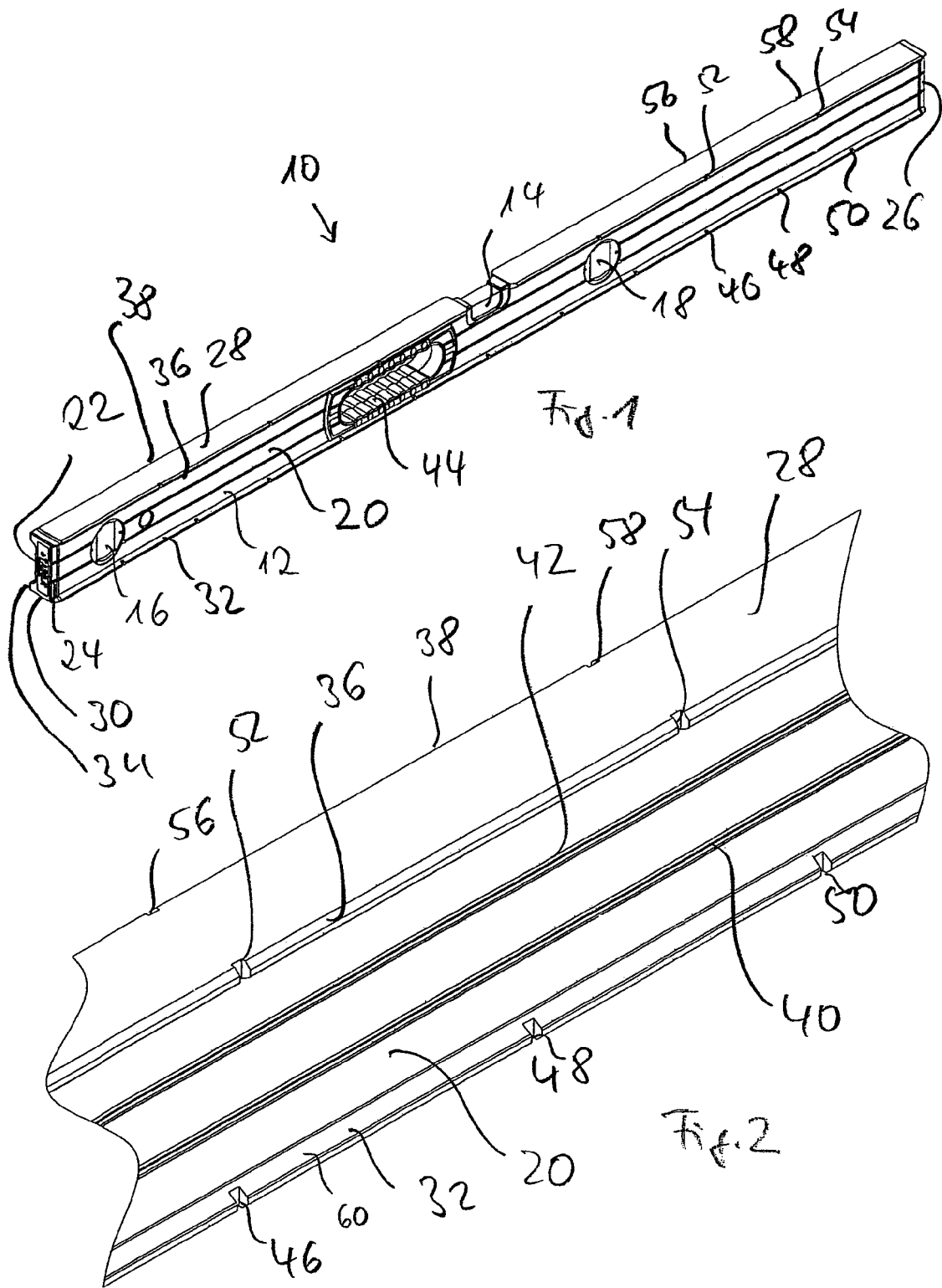

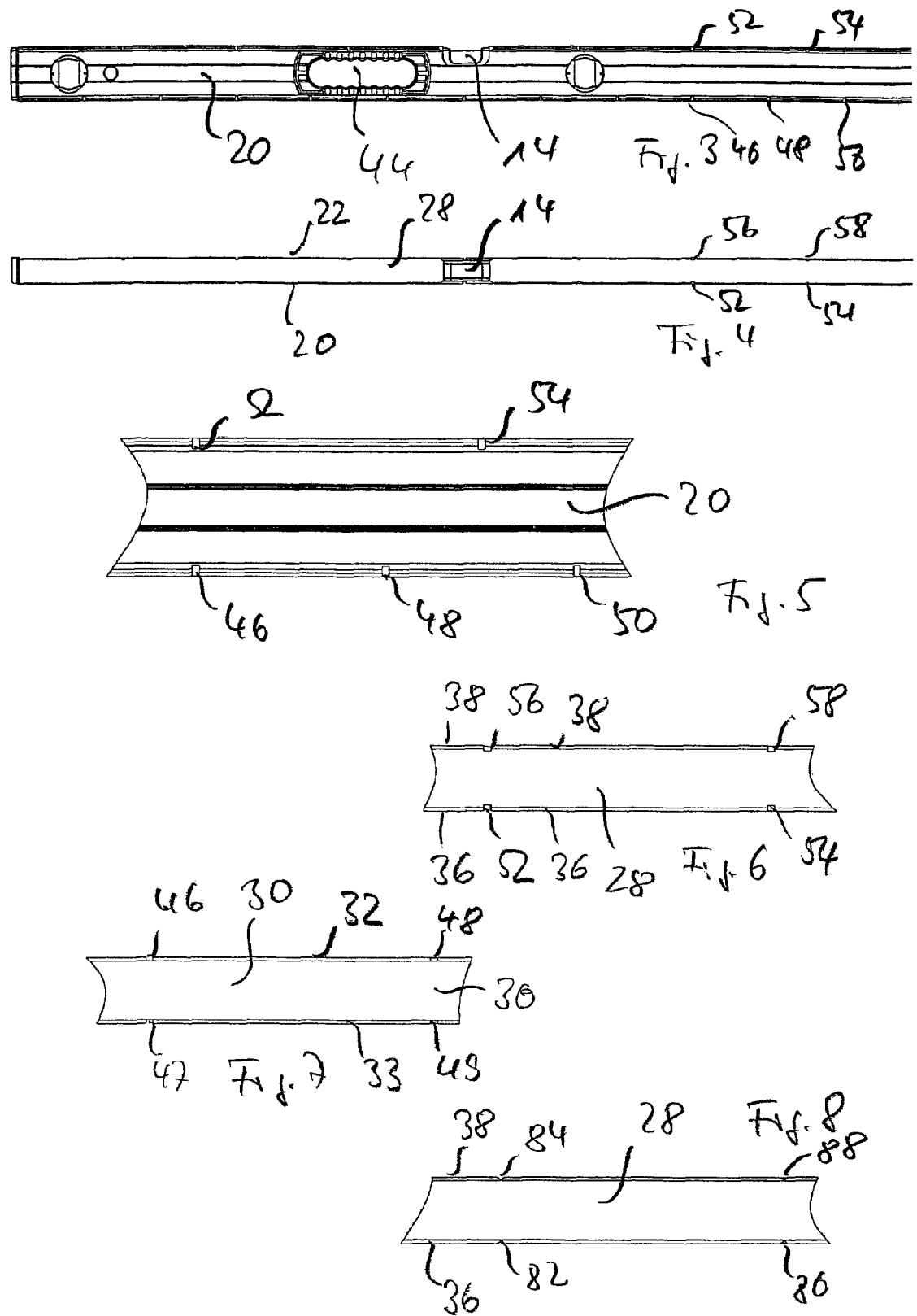

SPIRIT LEVEL

BACKGROUND OF THE INVENTION

The invention concerns a spirit level comprising a profiled body with lateral surfaces, end faces or areas, and longitudinal surfaces forming measuring surfaces between the lateral surfaces, which project with their longitudinal edges laterally over the lateral surfaces, as well as at least one position sensor, such as a vial.

Spirit levels serve for verifying the horizontality or verticality of objects. A position sensor, such as a vial installed in the spirit level body, which is to be aligned with respect to the measuring surfaces, is provided for this purpose. The corresponding spirit levels frequently have more than one position sensor.

In order to check composite structures, such as walls or pavements, the spirit level is fitted on a straightedge, or spirit levels with lengths of 30 cm to 200 cm are used, for example.

The spirit level body can be made from hard wood, plastic, aluminum casting, or aluminum, just to name a few materials as examples.

From DE-A-34 14 216 a spirit level is known with which not only horizontality or verticality can be verified, but with which it is also possible to arrange components at exact intervals resting on one line. The components can be switch and socket box arrangements. The spirit level body features for this purpose template-like recesses going out of a longitudinal surface, which have a semicircular geometry in cross section. The distribution and size of the recesses is such that the corresponding longitudinal surface can no longer be used as a measuring surface.

A switch box fitting device in the form of a plate element is known from DE-A-195 03 408. Notches are made in the longitudinal edges, which serve for marking purposes. A vial is provided for the purpose of aligning the template.

According to DE-U-93 17 625, a switch box fitting device, which consists of a flat body on which notches are made for marking purposes, is used for measuring components.

A spirit level which consists of a T-shaped metallic profile is the object of DE-U-202 02 126.

From DE-U-83 03 339 is known a multi-link folding rod, in which longitudinal partitions in the form of indentations are configured.

SUMMARY OF THE INVENTION

It is the object of the invention to further develop a spirit level with longitudinal surfaces configured as measuring surfaces of the kind described above in such a way that not only a verification of horizontality or verticality can be carried out, but especially even with composite structures, assistance is provided for maintaining intervals. In particular, the spirit level should serve as a carpenter's or mason's level, which also makes it easier for the user to verify different distance dimensions, or it may serve as an auxiliary means of maintaining mutually differing distances.

The object is achieved according to the invention in that a uniform series of indentations is provided on at least one longitudinal edge. It is proposed in particular that at least two longitudinal edges be provided, each with a uniform series of indentations, where the indentations of one series have a different distance between them than those of the other series.

It is particularly provided therein that series of different intervals between indentations start at the longitudinal edges running along the lateral surface.

Preferably the distance between the indentations of one series is equal to the stacked volume of a standard brick. Thus, with the aid of the spirit level according to the invention, assistance can in particular be provided for the stacked volume of bricks with different dimensions. As a consequence, the spirit level according to the invention especially facilitates the laying of bricks so that they maintain the required distance between each other, along with the required verticality.

If it is possible that the intervals between indentations in each longitudinal edge deviate from each other, so that a total of four different series of indentations are present in a spirit level with two measuring surfaces, the same series are preferably provided in the longitudinal edges of a measuring surface.

The indentations, such as notches or grooves, are preferably only provided on the longitudinal edges themselves, without there being an extension within the measuring surfaces whose areas run between the lateral end faces.

The edges of the indentations that run along the longitudinal sides should furthermore be rounded.

The indentation is preferably an indentation featuring a rectangular geometry, such as a groove in the longitudinal edge. The indentation should end at a distance from the plane that spans the lateral surface, that is, it should extend exclusively within the outer edge area of the longitudinal edge. Other geometries, such as triangular shapes, are likewise possible for the indentations.

In order to preclude the danger of injuries, the longitudinal edge should have an edge area that tapers in cross section at its ends, within which the indentation runs.

The preferred dimensions of the indentations with regard to their respective extension vertically with respect to the longitudinal direction of the profiled body are between 0.1 mm and 5 mm, preferably between 2 mm and 4 mm, and in the longitudinal direction between 1 mm and 10 mm, especially less than 5 mm. The small extension transversely to the longitudinal direction can be achieved in that only the coating or paint layer of the spirit level body is penetrated up to the body itself.

The indentations serve not only to verify the stacked volume of bricks or as a gauge for bricklaying, but due to their configuration can also serve for the attachment of a string, so that the spirit level also exercises the function of a line level.

The spirit level according to the invention thus satisfies the requirements of three functions, namely that of the usual spirit levels for verifying horizontality and verticality, that of a carpenter's or mason's level, as well as that of a spirit level for hanging a plumb line.

The invention is also characterized by the use of a spirit level comprising a profiled body with lateral surfaces, end faces, and longitudinal surfaces that form measuring surfaces running between the lateral surfaces, which project with their longitudinal edges laterally over the lateral surfaces, as well as at least one position sensor, whereby in at least one longitudinal edge a uniform series of indentations is provided for the purpose of erecting a brickwork of standard bricks that can be arranged one on top of the other in stacked volume, wherein the distance between two successive indentations in the at least one longitudinal edge corresponds to the stacked volume of the standard bricks arranged one on top of the other.

BRIEF DESCRIPTION OF THE DRAWINGS

Further details, advantages, and features of the invention are disclosed not only in the claims and the features that can be inferred from them (per se and/or in combination), but also from the preferred exemplary embodiments that can be inferred from the following description of the drawings, in which:

FIG. 1 shows a perspective view of a spirit level;

FIG. 2 shows a section of the spirit level according to FIG. 1 in an enlarged representation;

FIG. 3 shows a lateral view of the spirit level according to FIG. 1;

FIG. 4 shows a plan view of the spirit level according to FIG. 1;

FIG. 5 shows a section of the lateral representation of the spirit level according to FIG. 3;

FIG. 6 shows a plan view of the spirit level according to FIG. 5;

FIG. 7 shows a bottom view of the spirit level according to FIG. 5; and

FIG. 8 shows a further embodiment of a spirit level in plan view.

DESCRIPTION OF THE PREFERRED EMBODIMENTS

In FIG. 1 is shown a purely schematic representation of the spirit level 10, which features the usual spirit level body 12 with position sensors in the form of embedded vials 14, 16, 18, for the purpose of verifying the horizontality or verticality of objects such as brickwork. The spirit level body 12 features the geometry of a I-shaped profile with lateral surfaces 20, 22, preferably with side surfaces covered with protective caps 24, 26, as well as longitudinal surfaces 28, 30, which serve as measuring surfaces or soles. The measuring surfaces 28, 30 project with their longitudinal edges 32, 34, 36, 38 over the lateral surfaces 20, 22, whereby the I-shaped geometry is obtained. Since the spirit level body 12 is configured as a hollow body, longitudinal ribs 40, 42 can run in its longitudinal direction for reinforcement purposes, and namely within the lateral surfaces 20, 22. A handle 44 covered with plastic also extends between the lateral surfaces 20, 22, without this having to be a mandatory feature. The same applies to the configuration of the ribs 40, 42, the arrangement of the vials 16, 18, and/or the end caps 24, 26.

Separate from this, the spirit level according to the invention is characterized in that indentations, such as notches, are configured within the longitudinal edges 32, 34, 36, 38, which in FIG. 2 are identified with reference numerals 46, 48, 50, 52, 54, 56, 58. The indentations 46, 48, 50, 52, 56, 58 are arranged in such a way within the longitudinal edges 32, 34, 36, 38 that a uniform series of indentations is obtained in each longitudinal edge 32, 34, 36, 38, so that the intervals between the indentations 46, 48 and 48, 50 of the longitudinal edge 32 are identical to one another, while the indentations in another longitudinal edge, in the exemplary embodiment in the longitudinal edges 36, 38 can differ therefrom, that is, the distance between the indentations 52, 54 or 56, 58 differs from that of the indentations 46, 48 or 48, 50.

In other words, at least two longitudinal edges feature a uniform series of indentations, whereby the indentations of the one series have a distance that differs from that of the other series. This also becomes clear from observing the perspective representation according to FIG. 2.

The invention is, of course, not relinquished if the same series of indentations is configured within one longitudinal edge or within several longitudinal edges.

From the drawings it further follows that longitudinal edges that delimit a measuring surface feature the same series, that is, that the indentations 52, 54 provided within the longitudinal edges 36, 38 that delimit the measuring surface 28 are at identical intervals from each other. In addition, the indentations run in the longitudinal direction of the spirit level body 12 in such a way that the paired indentations 52, 56 or 54, 58 have the same distance to the end face or the end caps 24, 26.

The corresponding relationships also follow from FIGS. 3 and 4, without the need for further explanations.

The indentations 46, 48, 50, 52, 54, 56, 58 run preferably within areas of the longitudinal edges 32, 34, 36, 38 that taper to an essentially free outer longitudinal side, as can be seen in the perspective representation of FIG. 2. Thus the tapering longitudinal edge area 32, which has a trapezoidal or triangular geometry in cross section, is identified with reference numeral 60.

From FIG. 2 it follows that the indentations 46, 48 feature a rectangular geometry in cross section, whereby the extension in the longitudinal direction of the profile body amounts to approximately 1 mm and transversely to the longitudinal direction along the lateral surfaces amounts to about 3 mm.

FIGS. 6 and 7 show plan and bottom views of the spirit level 10. The rectangular geometry of the indentations 52, 54, 56, 58 can be discerned in the area of the upper side and the indentations 46, 47, 48, 49 in the area of the lower side. The indentations run from the respective outer edge of the longitudinal edges 32, 34, 36, 38.

From the comparison of the representations of the indentations it further follows that the indentations 52, 56 in the upper side 28 are aligned with the indentations 46, 47 in the lower side 30. In contrast, the indentations 54, 58 of the upper side 28 are offset with respect to the indentations 48, 49 of the lower side 30.

Independently of this, it should be noted that the indentations must not necessarily be extended by milling into the spirit level body 12, for example. Rather, it is sufficient if only the paintwork or the coating of the spirit level body is penetrated, so that the spirit level body 12, which is made of aluminum, for example, becomes visible. The indentations become clearly visible due to the contrast between the spirit level body and the coating or paintwork and can thus achieve the object for which they are intended.

The configuration of the indentations 80, 84, 86, 88 according to FIG. 8 differs considerably from those that were previously described as examples, in that it does not have a rectangular geometry in cross section, but a triangular geometry. The characteristics of the indentations 82, 84, 86, 88 correspond otherwise to those of FIGS. 6 and 7.

What is claimed is:

1. A spirit level comprising:

a profiled body having lateral surfaces having longitudinal edges, end surfaces, and longitudinal surfaces that form measuring surfaces running between the lateral surfaces, which project laterally over the lateral surfaces and the longitudinal edges, and at least one position sensor, wherein at least one of said longitudinal edges is provided with a series of indentations which are spaced by a distance corresponding to stacked size of a standard brick.

2. The spirit level of claim 1, wherein at least two longitudinal edges have a uniform series of said indentations, the indentations of one series having a distance therebetween that is different from that of the other series.

3. The spirit level of claim 1, wherein a series with different intervals between the indentations runs from the longitudinal edges along a lateral surface.

4. The spirit level of claim 1, wherein the longitudinal edges of measuring surfaces have identical series.

5. The spirit level of claim 1, wherein the indentations are notches.

6. The spirit level of claim 1, wherein the indentations are recesses, having a rectangular geometry in the longitudinal edge.

7. The spirit level of claim 1, wherein the indentations have a triangular geometry in cross section along longitudinal direction of the spirit level.

8. The spirit level of claim 1, wherein the indentations end at a distance from a plane spanned by a lateral surface.

9. The spirit level of claim 1, wherein the longitudinal edge has an edge area that tapers in cross section at ends thereof, within which the indentations run.

10. The spirit level of claim 1, wherein the indentations penetrate only a coating or paintwork on the longitudinal edges.

11. The spirit level of claim 1, wherein the indentations are rounded at outer longitudinal edges thereof.

12. The spirit level of claim 1, wherein the indentations have an extension L of $1\text{ mm} \leq L \leq 10\text{ mm}$, in a longitudinal direction of the profiled body.

13. The spirit level of claim 1, wherein the indentations have an extension T of $0.1\text{ mm} \leq T \leq 5\text{ mm}$, vertically to a longitudinal direction of the profiled body along the lateral surface.

14. The spirit level of claim 1, wherein the indentations run within the longitudinal edges outside of measuring surfaces delimited by the longitudinal edges.

15. Method for erecting a brickwork of standard bricks arranged one on top of another in a stacked size, using a spirit level comprising a profiled body with lateral surfaces with longitudinal edges, end faces, and longitudinal surfaces that form measuring surfaces running between the lateral surfaces, which project laterally over the lateral surfaces and the longitudinal edges, and at least one position sensor, at least one of said longitudinal edges being provided with a uniform series of indentations, wherein the distance between two successive indentations of the at least one longitudinal edge corresponds to the stacked size of the standard bricks arranged one on top of another.

* * * * *